US012679081B2

(12) United States Patent (10) Patent No.: US 12,679,081 B2

Yamada (45) Date of Patent: Jul. 14, 2026

(54) LAMINATING SYSTEM, RECORDING MEDIUM, AND LAMINATING DEVICE

(71) Applicant: Konica Minolta, Inc., Tokyo (JP)

(72) Inventor: Kenichi Yamada, Higashiyamato (JP)

(73) Assignee: Konica Minolta, Inc., Tokyo (JP)

( * ) Notice: Subject to any disclaimer, the term of this patent is extended or adjusted under 35 U.S.C. 154(b) by 179 days.

(21) Appl. No.: 18/330,618

(22) Filed: Jun. 7, 2023

(65) Prior Publication Data

US 2023/0391061 A1 Dec. 7, 2023

(30) Foreign Application Priority Data

Jun. 7, 2022 (JP) ................................. 2022-092357

(51) Int. Cl.
    *B32B 37/00* (2006.01)
    *B32B 38/00* (2006.01)
    *B32B 41/00* (2006.01)
    *G03G 15/00* (2006.01)

(52) U.S. Cl.
    CPC ...... *B32B 37/0053* (2013.01); *B32B 38/0004* (2013.01); *B32B 38/145* (2013.01); *B32B 41/00* (2013.01); *G03G 15/6585* (2013.01); *B32B 2037/0061* (2013.01)

(58) Field of Classification Search
    CPC .............. B32B 37/0053; B32B 37/223; B32B 38/0004; B32B 41/00; B32B 2037/0061; B32B 38/14; B32B 38/145; B65H 2301/22; B65H 2301/4451; B65H 2801/27; B65H 29/6636; B65H 29/6645; Y10T 156/1093; G03G 15/6585; B41M 7/0027

USPC .................................. 156/277, 367, 384, 387
See application file for complete search history.

(56) References Cited

U.S. PATENT DOCUMENTS

| | | | |
|---|---|---|---|
| 5,518,569 A * | 5/1996 | Achilles | B32B 38/1825 156/355 |
| 5,639,335 A | 6/1997 | Achilles et al. | |
| 2011/0094684 A1 | 4/2011 | Ohsawa | |
| 2019/0382229 A1* | 12/2019 | Kiriyama | G03G 15/655 |
| 2020/0009848 A1 | 1/2020 | Meckelein et al. | |

FOREIGN PATENT DOCUMENTS

| | | |
|---|---|---|
| GB | 2228255 A | 8/1990 |
| JP | H06-23689 A | 2/1994 |
| JP | 2000-62124 A | 2/2000 |

(Continued)

OTHER PUBLICATIONS

Office Action issued in counterpart European Application No. 23176728.6, mailed Dec. 4, 2024 (4 pages).

(Continued)

*Primary Examiner* — John L Goff, II

(74) *Attorney, Agent, or Firm* — Osha Bergman Watanabe & Burton LLP

(57) ABSTRACT

A laminating system includes: a sheet feeder that feeds a plurality of cut sheets; a continuous conveyor that conveys the cut sheets fed by the sheet feeder without any interval between the cut sheets; a laminator that executes laminating processing and attaches a laminate film to a target sheet among the cut sheets conveyed by the continuous conveyor; and a hardware processor that causes the sheet feeder to feed one or more insertion sheets at least before or after the target sheet of the laminating processing.

13 Claims, 12 Drawing Sheets

(56) References Cited

FOREIGN PATENT DOCUMENTS

| | | | |
|----|--------------|---|---------|
| JP | 2003025447 | A | 1/2003 |
| JP | 2004331370 | A | 11/2004 |
| JP | 2005343688 | A | 12/2005 |
| JP | 2009-73668 | A | 4/2009 |
| JP | 2018045078 | A | 3/2018 |
| JP | 2019148695 | A | 9/2019 |

OTHER PUBLICATIONS

Extended European Search Report issued in European Application No. 23176728.6 mailed Oct. 27, 2023 (7 pages).
Office Action issued in corresponding Chinese Patent Application No. 202310640357.5, dated Jun. 23, 2025, with translation (17 pages).
Office Action issued in counterpart European Patent Application No. 23176728.6 mailed Sep. 15, 2025 (5 pages).
Office Action issued in corresponding Chinese Patent Application No. 202310640357.5, dated Dec. 17, 2025, with translation (17 pages).
Office Action issued in corresponding Chinese Patent Application No. 202310640357.5, dated Mar. 31, 2026, with translation (12 pages).
Notice of Reasons for Refusal issued in corresponding Japanese Application No. 2022-092357, dated May 12, 2026 (9 pages).

\* cited by examiner

FIG.7
| ITEM | | LENGTH |
|---|---|---|
| APPARATUS MECHANISM | DISTANCE FROM BONDING SECTION TO FIXING SECTION | 150 [mm] |
| ATTACHING MECHANISM | DISTANCE BETWEEN LEADING END OF FIRST SHEET AND LEADING END OF FILM (DISTANCE BETWEEN REAR END OF LAST SHEET AND REAR END OF FILM) | 100 [mm] |
| SHEET TYPE OF SHEET | HIGH QUALITY SHEET（240gsm） | 150 [mm] |
| TYPE OF FILM | FILM 1 | 250 [mm] |
| TOTAL(LAMINATE STABLE DISTANCE) | | 650 [mm] |
FIG.8
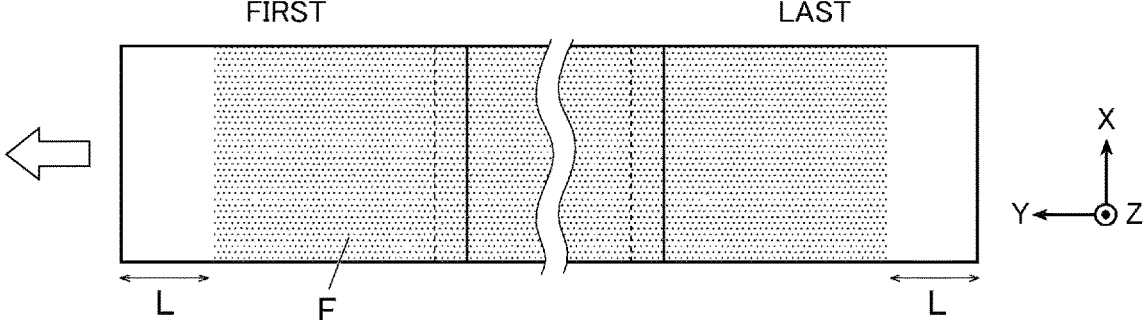
FIG.9
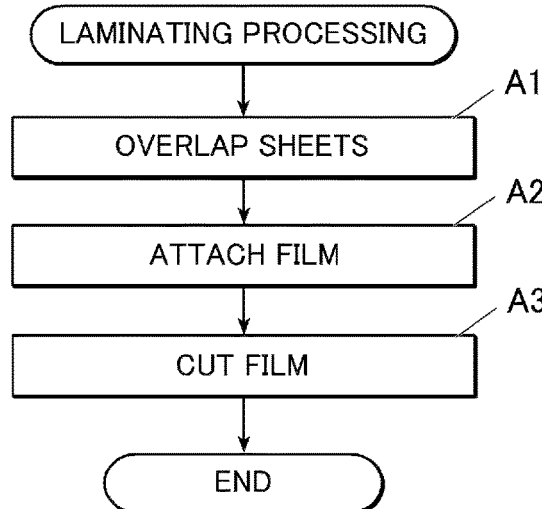

LAMINATING SYSTEM, RECORDING MEDIUM, AND LAMINATING DEVICE

CROSS-REFERENCE TO RELATED APPLICATIONS

The entire disclosure of Japanese Patent Application No. 2022-092357 filed on Jun. 7, 2022 is incorporated herein by reference.

BACKGROUND

Technical Field

The present invention relates to a laminating system, a recording medium, and a laminating device.

Description of Related Art

Japanese Unexamined Patent Publication No. H 06-023689 and Japanese Unexamined Patent Publication No. 2000-62124 disclose a laminating device in which a laminating processing is performed by laminating a strip-shaped laminate film on a sheet that is continuously conveyed while a rear end portion of a preceding sheet and a front end portion of a following sheet are overlapped by a predetermined amount.

Since the laminate film has an adhesive layer on a surface on the sheet side, when the laminate film alone is conveyed in the apparatus without a sheet, the adhesive layer adheres to rollers and a conveying path in the apparatus, causing conveyance trouble. In a case where the laminating processing is performed with the strip-shaped laminate film laminated by overlapping the rear end portion of the preceding sheet and the front end portion of the following sheet by a predetermined amount, the adhesive layer of the laminate film is not exposed, and such trouble can be prevented.

On the other hand, since there is no preceding sheet for the leading (first) sheet of the sheets to be laminated, the above-described overlap cannot be performed. It is also conceivable to attach a laminate film to the sheet at a predetermined distance from the leading end of the leading sheet so that the adhesive layer is not exposed. However, in this case, the leading sheet does not become a correct product but becomes a so-called waste sheet. It is difficult to combine the leading end of the leading sheet and the leading end of the laminate film without misalignment when attaching the laminate film to the sheet. Even if the leading end of the leading sheet and the leading end of the laminate film can be attached together accurately, a leading end portion of the laminate film attached to the leading sheet is likely to float relative to the sheets and is not bonded uniformly in some cases. As a result, the laminate film does not come into close contact with the leading end of the sheet and is easily peeled off, or wrinkles or the like are generated, and it is difficult to stably attach the laminate film with high quality. In such a case, at least the leading sheet among the sheets to be laminated becomes the waste sheet.

The same can be said for alignment of the rear end of the last sheet and the rear end of the laminate film.

Thus, there is a possibility that waste sheet may occur in at least the first sheet and the last sheet of the sheets to be laminated, which makes it difficult to provide laminating processing with high quality for all the sheets to be laminated.

SUMMARY

One or more embodiments of the present invention provide a laminating system, a recording medium, and a laminating device that perform a laminating processing with high quality.

According to an aspect of the present invention, a laminating system includes:

a sheet feed section (i.e., sheet feeder) that feeds a plurality of cut sheets;

a continuous conveying section (i.e., continuous conveyor) that conveys the cut sheets fed by the sheet feed section without any interval between the cut sheets;

a laminating section (i.e., laminator) that executes laminating processing and attaches a laminate film to a target sheet among the cut sheets conveyed by the continuous conveying section; and a hardware processor that causes the sheet feed section to feed one or more insertion sheets at least before or after the target sheet of the laminating processing.

According to another aspect of the present invention, a non-transitory computer-readable recording medium storing instructions causing a hardware processor in a computer included in a laminating system including, a sheet feed section (i.e., sheet feeder) that feeds a plurality of cut sheets, a continuous conveying section (i.e., continuous conveyor) that conveys the cut sheets fed by the sheet feed section without any interval between the cut sheets, and a laminating section (i.e., laminator) that executes laminating processing and attaches a laminate film to a target sheet among the cut sheets conveyed by the continuous conveying section, the instructions causing the hardware processor to perform, causing the sheet feed section to feed one or more insertion sheets at least before or after the target sheet of the laminating processing.

According to another aspect of the present invention, a laminating device including:

a sheet feed section (i.e., sheet feeder) that feeds a plurality of cut sheets;

a continuous conveying section (i.e., continuous conveyor) that conveys the cut sheets fed by the sheet feed section without any interval between the cut sheets;

a laminating section (i.e., laminator) that executes laminating processing and attaches a laminate film to a target sheet among the cut sheets conveyed by the continuous conveying section; and a hardware processor that causes the sheet feed section to feed one or more insertion sheets at least before or after the target sheet of the laminating processing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 7 is a diagram illustrating an example of calculation of a laminate stable distance according to the first embodiment;

FIG. 8 is a view illustrating a distance between a leading end of a first sheet and a leading end of a laminate film and a distance between a rear end of a last sheet and a rear end of a laminate film according to the first embodiment;

FIG. 9 is a flowchart showing the flow of the laminating processing according to the first embodiment;

DETAILED DESCRIPTION

Hereinafter, embodiments of a laminating system, a recording medium, and a laminating device of the present invention will be described with reference to the drawings. However, the scope of the invention is not limited to the disclosed embodiments.

First Embodiment (Configuration of Laminating System)

Figure 1:
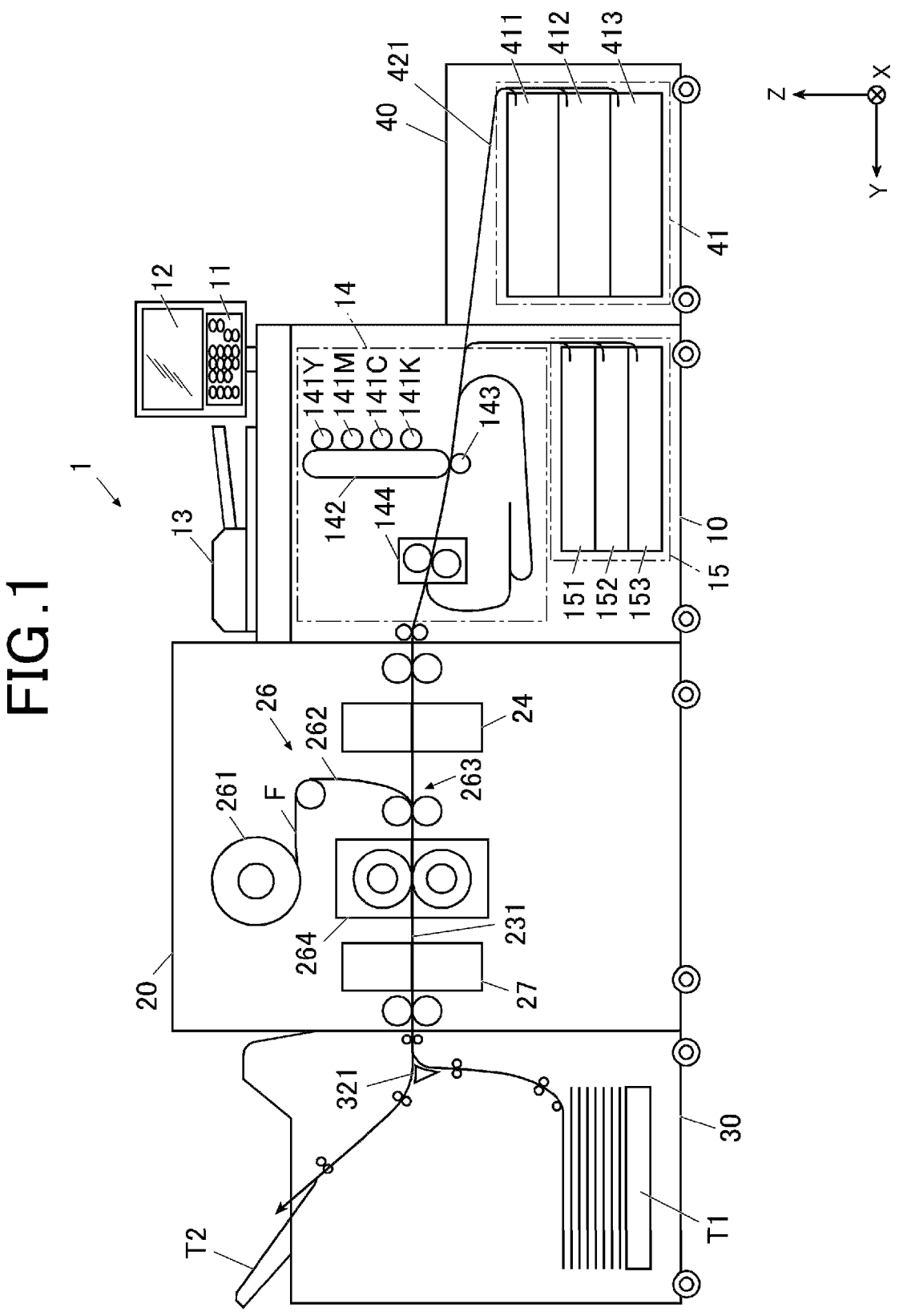
FIG. 1 is a front view showing a schematic configuration of a laminating system according to a first embodiment.
Figure 2:
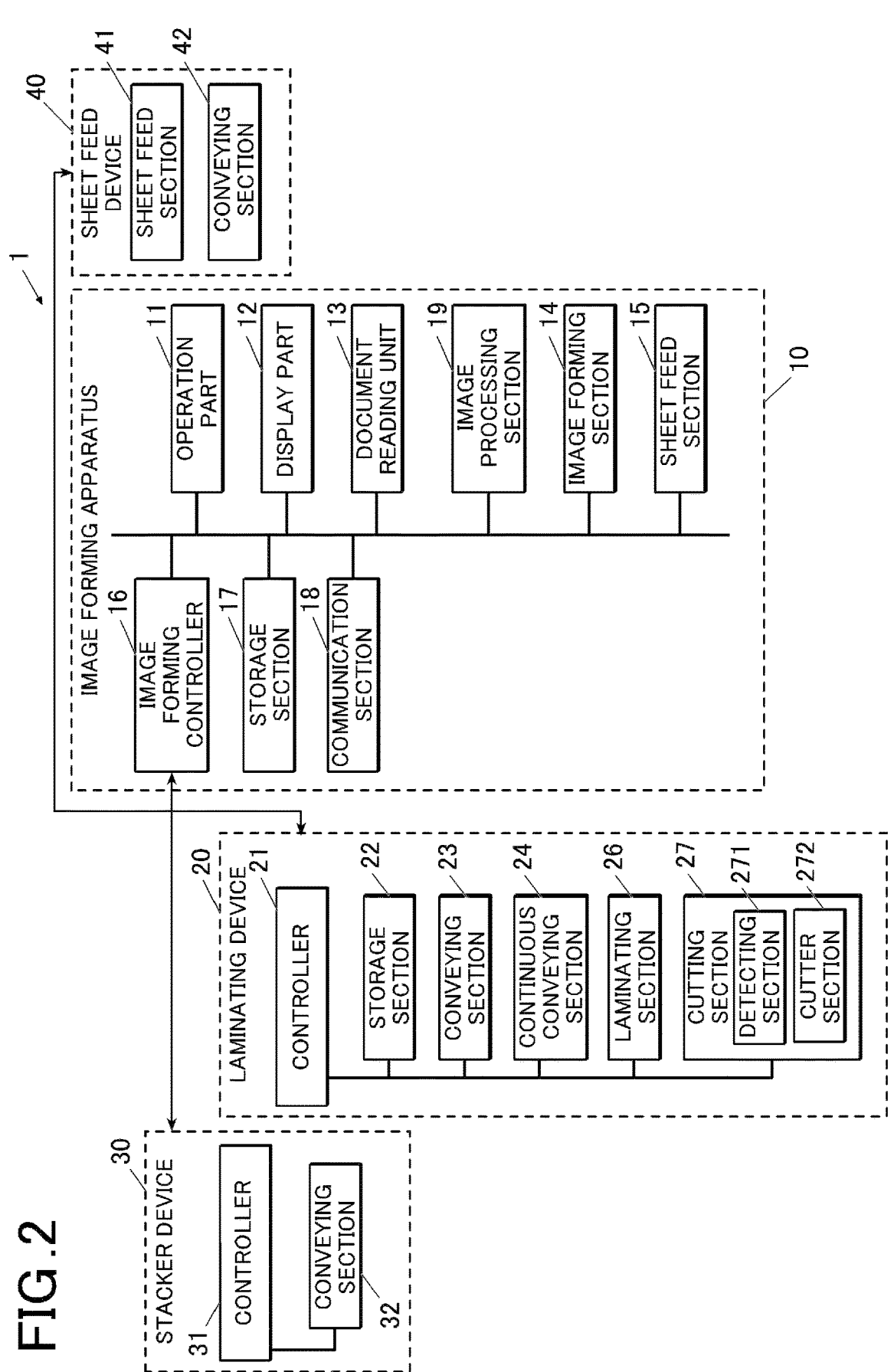
FIG. 2 is a functional block diagram showing a control structure of the laminating system according to the first embodiment.

As illustrated in FIGS. 1 and 2, a laminating system (hereinafter, referred to as a system 1) according to the present embodiment comprises a sheet feed device 40, an image forming apparatus 10, a laminating device 20, and a stacker device 30.

The sheet feed device 40 comprises a sheet feed section (or sheet feeder) 41 and a conveying section (or sheet conveyor) 42, and conveys a sheet (cut sheet) from any one of sheet feed trays 411 to 413 of the sheet feed section 41 to the image forming apparatus 10 according to a job.

The conveying section 42 comprises a conveying path 421 that connects the sheet feed section 41 and the image forming apparatus 10, and conveys the sheet from the sheet feed section 41 to the image forming apparatus 10.

The sheet feed section 41 comprises sheet feed trays 411 to 413 that are housing sections (or housings) each storing a predetermined type and/or size of the sheet.

Depending on the condition such as a printing amount and the type of sheet to be used, the sheet feed device 40 may be omitted, and the sheet may be conveyed only from a sheet feed section 15 (or sheet feeder) of the image forming apparatus 10.

The image forming apparatus 10 forms a color image by an electrophotographic method, based on image data obtained by reading an image from a document or image data of a job received from an external device (not illustrated). The image forming apparatus 10 ejects the sheet on which the image is formed to the laminating device 20.

As illustrated in FIGS. 1 and 2, the image forming apparatus 10 comprises an operation part (or operation device) 11, a display part (or display device) 12, a document reading unit (or document reader) 13, an image forming section (or image forming device) 14, the sheet feed section 15, an image forming controller 16 (hardware processor), a storage section (or storage) 17, a communication section (or communication interface) 18, and an image processing section (or image processing device) 19.

The operation part 11 comprises a touch panel formed to cover a display screen of the display part 12, and various operation buttons such as numeric buttons and a start button. The operation part 11 outputs an operation signal based on a user's operation to the image forming controller 16.

The display part 12 comprises a liquid crystal display (LCD) and displays various screens based on an instruction of a display signal input from the image forming controller 16.

The document reading unit 13 comprises an automatic document feeder (ADF) and a scanner, and outputs image data obtained by reading the image from the document to the image forming controller 16.

The image forming section 14 forms the image on the sheet supplied by the sheet feed section 15 or the sheet feed device 40, based on the image data subjected to image processing by the image processing section 19. In the present embodiment, the sheet is a flat sheet or a paper sheet.

The image forming section 14 comprises photosensitive drums 141Y, 141M, 141C, and 141K corresponding to respective colors of yellow (Y), magenta (M), cyan (C), and black (K), an intermediate transfer belt 142, a secondary transfer roller 143, and a fixing section (or fixing device) 144.

The image forming section 14 uniformly charges the photosensitive drum 141Y and then performs scanning exposure with a laser beam based on the image data for yellow to form an electrostatic latent image. Next, the image forming section 14 causes yellow toner to adhere to the electrostatic latent image on the photosensitive drum 141Y and develops the images.

Since the photosensitive drums 141M, 141C, and 141K are the same as the photosensitive drum 141Y except that the handled colors are different, the description thereof will be omitted.

The image forming section 14 sequentially transfers the toner images of the respective colors formed on the photosensitive drums 141Y, 141M, 141C, and 141K onto the rotating intermediate transfer belt 142 (primary transfer). The image forming section 14 forms a color toner image in which toner images of four colors are overlapped one another on the intermediate transfer belt 142.

The image forming section 14 collectively transfers the color toner image on the intermediate transfer belt 142 onto the sheet by the secondary transfer roller 143 (secondary transfer).

The fixing section 144 comprises a heating roller that heats the sheet on which the color toner image is transferred and a pressure roller that pressurizes the sheet, and fixes the color toner image on the sheet by heating and pressurizing.

The sheet feed section 15 comprises sheet feed trays 151 to 153, which are housing sections (or housings), and supplies sheets (cut sheet) to the image forming section 14. Each of the sheet feed trays 151 to 153 stores sheets with a type and/or size predetermined for each sheet feed tray.

The image forming controller 16 comprises a central processing unit (CPU), a random access memory (RAM), and a read only memory (ROM). The CPU reads various processing programs or instructions stored in the ROM and deploys the programs or instructions to the RAM. Next, the CPU integrally controls the operation of the image forming apparatus 10 in coordination with the various programs or instructions deployed in the RAM.

When executing laminating processing on the output sheet, the image forming controller 16 instructs the laminating device 20 to execute predetermined laminating processing.

The image forming controller 16 instructs the stacker device 30 to execute a predetermined sheet ejection processing.

The image forming controller 16 causes the sheet feed section 41 of the sheet feed device 40 or the sheet feed section 15 to feed an insertion sheet at least before or after a target sheet of the laminating processing in the job. The image forming controller 16 functions as the controller.

The image forming controller 16 controls the image forming section 14.

The image forming controller 16 calculates the number of insertion sheets to be inserted based on a stable distance (laminate stable distance) of the laminating processing and a length of the cut sheet (sheet) in the conveying direction. The image forming controller 16 functions as a calculator.

The image forming controller 16 receives a user input via the operation part 11 indicating the number of insertion sheets to be inserted. The image forming controller 16 functions as a receiver.

The storage section 17 is a non-volatile storage device such as a hard disk drive (HDD) or a semiconductor memory that stores various data such as programs or instructions and image data. The storage section 17 stores data such as program or instruction data and various setting data so that the data can be read and written by the image forming controller 16.

The communication section 18 comprises a communication control card such as a local area network (LAN) card, for example. The communication section 18 exchanges various kinds of data with an external device (e.g., a personal computer) connected to a communication network such as a LAN or a wide area network (WAN).

The image processing section 19 may have similar functional configuration to that of the image forming controller 16, and executes necessary image processing on image data stored in the storage section 17, image data obtained by reading an image from a document by the document reading unit 13, and image data input from an external device. Next, the image processing section 19 transmits the image data after the image processing to the image forming section 14. The image processing includes gradation processing, halftone processing, and color conversion processing. The gradation processing converts a gradation value of each pixel of the image data into a gradation value corrected such that a density characteristic of the image formed on the sheet matches a target density characteristic. The halftone processing includes error diffusion processing, and screen processing using a systematic dither method. The color conversion processing converts each gradation value of RGB into each gradation value of CMYK.

The laminating device 20 is positioned between the image forming apparatus 10 and the stacker device 30.

The laminating device 20 comprises a controller 21, a storage section (or storage) 22, a conveying section (or sheet conveyor) 23, a continuous conveying section (or continuous conveyor) 24, a laminating section (or laminator) 26, and a cutting section (or cutting device) 27.

The controller 21 comprises a CPU, a RAM, and a ROM. The CPU reads various processing programs or instructions stored in the ROM and deploys the programs or instructions to the RAM. Next, the CPU integrally controls the operation of the laminating device 20 in coordination with the various programs or instructions deployed in the RAM.

The controller 21 executes the laminating processing on the sheet in response to an instruction signal received from the image forming apparatus 10.

The storage section 22 is a nonvolatile storage device such as an HDD or a semiconductor memory that stores various data such as programs or instructions. The storage section 22 stores data such as program or instruction data and various setting data so that the data can be read and written by the controller 21.

The conveying section 23 comprises a conveying path 231 and a plurality of rollers. A conveying section 23 conveys the sheet conveyed from the image forming apparatus 10 to the continuous conveying section 24, the laminating section 26, and the cutting section 27 in this order, and conveys the sheet subjected to laminating processing to the stacker device 30.

As illustrated in FIG. 1, the continuous conveying section 24 is located upstream of the laminating section 26 in the sheet conveying path.

The continuous conveying section 24 overlaps the rear end portion of the preceding sheet on an upper portion of the front end portion of the following sheet by a predetermined overlap amount, and conveys the sheets in a continuous belt shape without intervals. As a method of overlapping the sheets, a known method can be used (e.g., see Japanese Unexamined Patent Publication No. 2009-073668).

Figure 3:
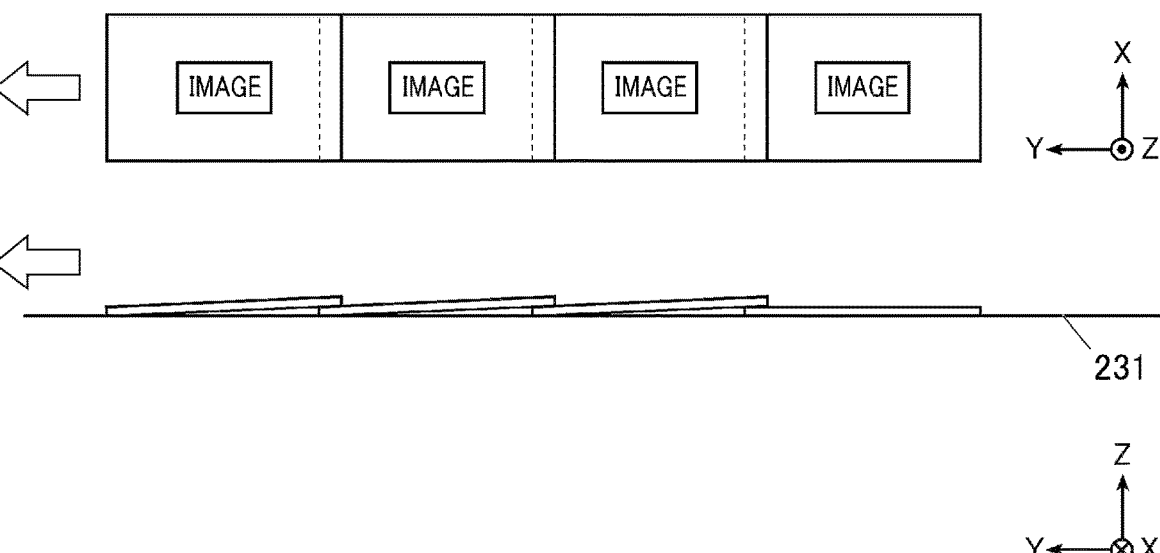
FIG. 3 is a view showing an example in which a sheet is conveyed in a continuous belt shape according to the first embodiment.

FIG. 3 illustrates an example in which the sheets are conveyed in a continuous belt form. The arrow illustrated in FIG. 3 indicates a conveying direction of the sheets. The upper portion of the drawing of FIG. 3 is a view of the sheet as viewed from above. The lower portion of the drawing of FIG. 3 is a view of the sheet as viewed from a direction orthogonal to the conveying direction on the sheet.

The laminating section 26 continuously attaches a film F to a surface (front surface) of the sheet on which an image is formed by the image forming apparatus 10.

The laminating section 26 comprises a film roll 261, a conveying path 262, a bonding section (or bonding device) 263, and a fixing section (or fixing device) 264.

The film roll 261 is a rolled film F including two layers of a transparent resin film layer as a base material layer and an adhesive layer.

The conveying path 262 transports the film F from the film roll 261 to a nip portion of the bonding section 263.

As illustrated in FIG. 1, the bonding section 263 comprises two rollers. The bonding section 263 sandwiches the sheet and the film F in the nip portion formed by the two rollers, thereby adhering the adhesive layer of the film F to the surface of the sheet. The bonding section 263 thus bonds the sheet and the film F.

The fixing section 264 comprises, for thermally pressing the sheet, a heating roller that heats the sheet to which the film F is attached, and a pressure roller that presses the sheet. The fixing section 264 melts the adhesive layer of the film F by heating and fixes the film F to the sheet by pressurizing.

The cutting section 27 comprises a detecting section (or detector) 271 and a cutter section (or cutter unit) 272.

The detecting section 271 detects an edge of the sheet. The detecting section 271 outputs a detected result to the controller 21.

The cutter section 272 comprises a blade (not illustrated), and a movement mechanism (not illustrated) that moves the blade in a width direction of the sheet.

Under the control of the controller 21, the cutter section 272 inserts the blade between the overlapped end portions of the preceding sheet and the following sheet at the edge of the rear end of the preceding sheet. Next, the cutter section 272 pushes down and releases the overlapped end portion of the subsequent sheet by the blade, and moves the blade in the width direction of the sheet. The cutter section 272 thus cuts the continuous laminate film F along the edge of the rear end of the preceding sheet. Thus, the sheets can be separated from each other.

The stacker device 30 is located downstream of the laminating device 20.

The stacker device 30 comprises a controller 31, a conveying section (or sheet conveyor) 32, a large-capacity sheet ejection tray T1, and a sub-tray T2.

The large-capacity sheet ejection tray T1 comprises a stage that moves up and down, and stores a large number of sheets stacked on the stage.

The stacker device 30 ejects the sheets to the sub-tray T2 in a state in which the sheet is exposed to the outside and is visible.

The controller 31 comprises a CPU, a RAM, and a ROM. The CPU reads various processing programs or instructions stored in the ROM and deploys the programs or instructions to the RAM. Next, the CPU integrally controls the operation of the stacker device 30 in coordination with the various programs or instructions deployed in the RAM.

In response to the instruction signal received from the image forming apparatus 10, the controller 31 performs a sheet ejection processing in which the laminated sheet conveyed from the laminating device 20 is ejected to the large-capacity sheet ejection tray T1 or the sub-tray T2.

The conveying section 32 comprises a conveying path 321 and a plurality of rollers. Under the control of the controller 31, the conveying section 32 ejects the laminated sheet conveyed from the laminating device 20 to the large-capacity sheet ejection tray T1 or the sub-tray T2.

(Operation of Laminating System)

Next, the operation of the system 1 according to the present embodiment is described with reference to the flowchart in FIG. 4.

Figure 4:
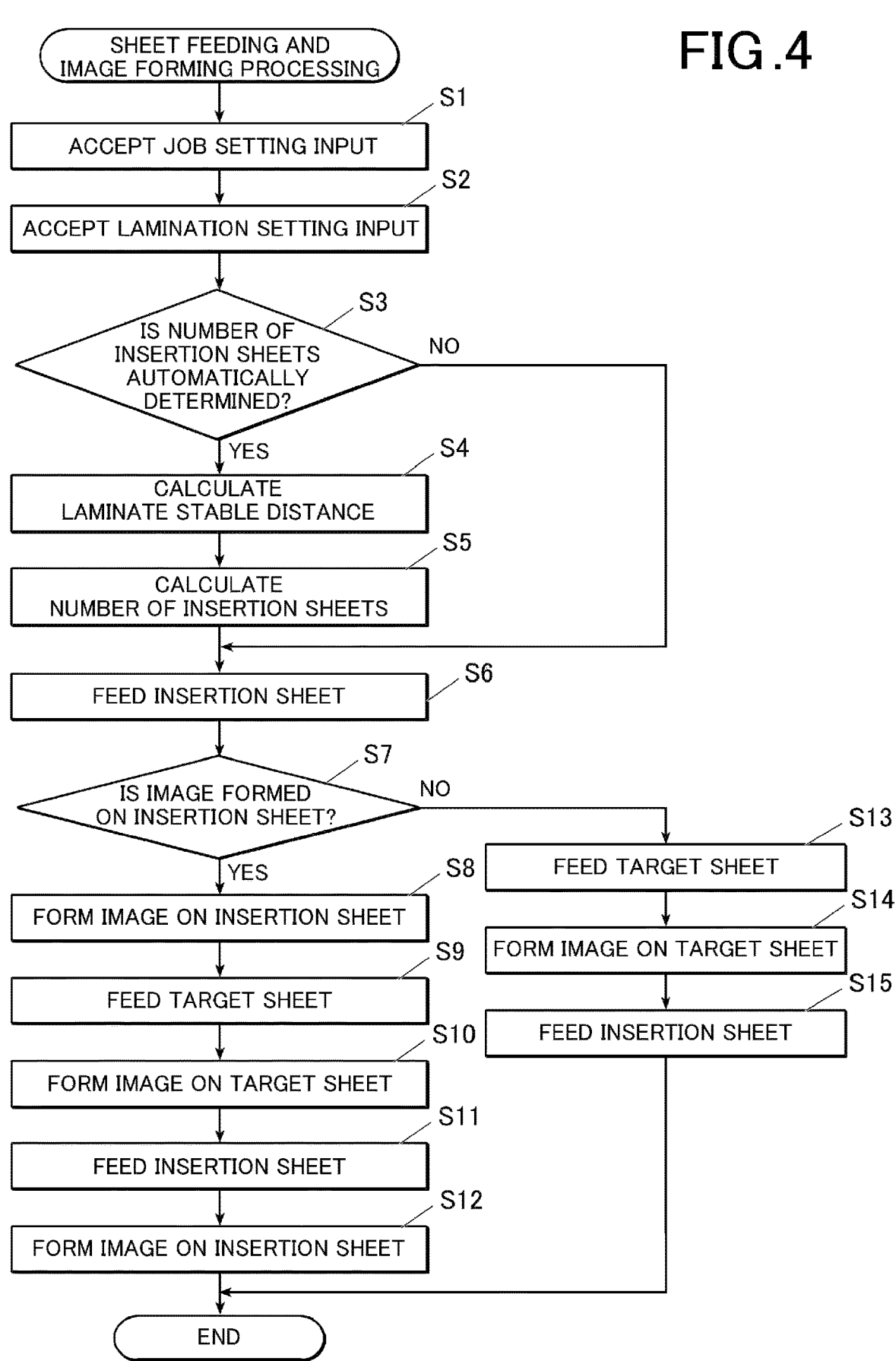
FIG. 4 is a flowchart showing the flow of a sheet feeding and image forming processing according to the first embodiment.

When the image forming apparatus 10 receives the job including a laminating processing from an external device or when the job is input by the user via the operation part 11, the system 1 executes the sheet feeding and image forming processing illustrated in FIG. 4.

The sheet feeding and image forming processing includes inserting the insertion sheets before and after the target sheet and forming the image only on the target sheet or on the insertion sheet and the target sheet. The target sheet means the sheet on which the job image is formed and to which the lamination processing is performed.

Figure 5:
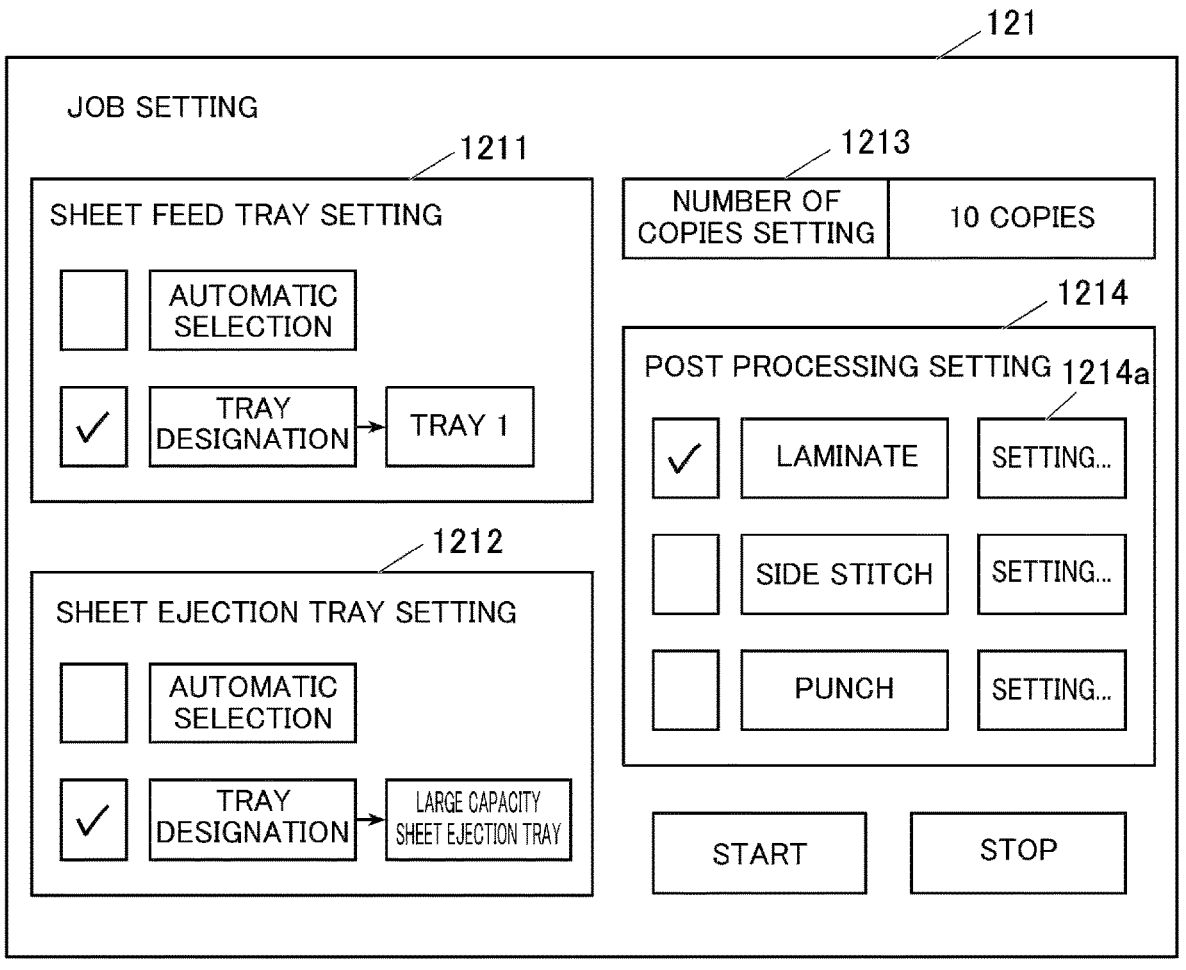
FIG. 5 is a view illustrating an example of a job setting screen according to the first embodiment.

In the sheet feeding and image forming processing, first, the image forming controller 16 causes the display part 12 to display a job setting screen 121 shown in FIG. 5. The image forming controller 16 receives a user input to set the job (job setting) via the operation part 11 (step S1).

In the example illustrated in FIG. 5, the image forming controller 16 receives, in the sheet feed tray setting 1211, a setting to set the sheet feed tray that feeds the target sheet.

In the sheet feed tray setting 1211, the user can select the setting of the sheet feed tray for feeding the target sheet from "automatic selection" by the image forming controller 16 or "tray designation" in which the user designates or specifies the sheet feed tray. In the example illustrated in FIG. 5, the user selects "tray designation".

In a case where the user selects "tray designation", the image forming controller 16 receives a user input to designate or specify the sheet feed tray. The sheet tray that can be specified is one of the sheet trays 411 to 413 and the sheet feed trays 151 to 153 included in the sheet feed device 40. In the example illustrated in FIG. 5, the user has selected "tray 1".

Since the sheet feed tray stores sheets of each predetermined type and/or size, the user can select the type and/or size of the sheet to be set as the target sheet by selecting the sheet feed tray.

In the example illustrated in FIG. 5, the image forming controller 16 receives, in sheet ejection tray setting 1212, a setting of a sheet ejection tray to which the target sheet is to be ejected.

In the sheet ejection tray setting 1212, the user can select the setting of the sheet ejection tray for ejecting the target sheet from "automatic selection" by the image forming controller 16 or "tray designation" in which the user designates or specifies the sheet ejection tray. In the example illustrated in FIG. 5, the user selects "tray designation".

In a case where the user selects the "tray designation", the image forming controller 16 receives a user input to designate or specify the sheet ejection tray. The sheet ejection tray that can be specified is the large-capacity sheet ejection tray T1 or the sub-tray T2. In the example illustrated in FIG. 5, the user selects the large-capacity sheet ejection tray (T1).

In the example illustrated in FIG. 5, the image forming controller 16 receives a setting of the number of output copies of the job in number of copies setting 1213. In the example illustrated in FIG. 5, the user has set the number of output copies to "10 copies".

In the example illustrated in FIG. 5, the image forming controller 16 receives, in post-processing setting 1214, a setting of post-processing to be performed on the target sheet.

In the post-processing setting 1214, the user can select the post-processing to be performed on the target sheet from "laminate" processing, "side stitch" processing, and "punch" processing. In the example shown in FIG. 5, the user selects the "laminate" processing.

The user can make a setting of the post-processing, which is the "laminate" processing, the "side stitch" processing, or the "punch" processing, by pressing a setting button 1214a.

Figure 6:
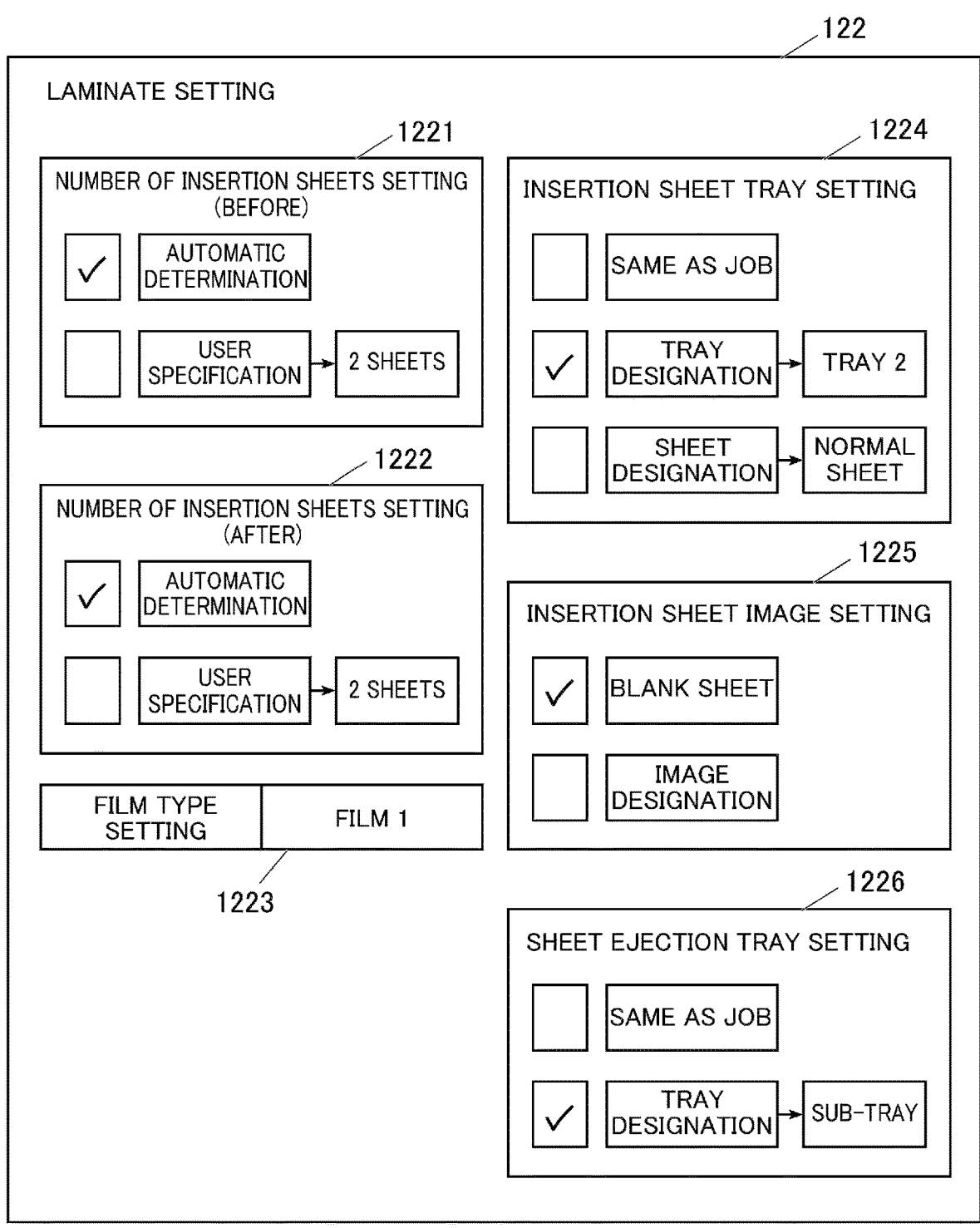
FIG. 6 is a diagram illustrating an example of a laminate setting screen according to the first embodiment.

When the user presses the setting button 1214a of the "laminate" process, the image forming controller 16 causes the display part 12 to display a laminate setting screen 122 as shown in FIG. 6. The image forming controller 16 receives a user input of the setting of the laminating processing (lamination setting) via the operation part 11 (step S2).

In the example illustrated in FIG. 6, the image forming controller 16 receives the setting of the number of insertion sheets to be inserted before the target sheet in the number-of-insertion-sheets setting (before) 1221.

In the number-of-insertion-sheets setting (before) 1221, the user can select a setting of the number of insertion sheets to be inserted before the target sheet from "automatic determination" by the image forming controller 16 or "user specification". In the example shown in FIG. 6, the user selects "automatic determination". When the user selects "user specification", the image forming controller 16 receives a user input to specify the number of insertion sheets to be inserted before the target sheet.

In the example illustrated in FIG. 6, in the number-of-insertion-sheets setting (after) 1222, the image forming controller 16 receives the setting of the number of insertion sheets to be inserted after the target sheet, similarly to the number-of-insertion-sheets setting (before) 1221. In the example shown in FIG. 6, the user selects "automatic determination".

In the example shown in FIG. 6, the image forming controller 16 receives the setting of the type of the film F to be laminated on the target sheet in the film type setting 1223. In the example illustrated in FIG. 6, the user has set the type of film F to "film 1".

In the example illustrated in FIG. 6, the image forming controller 16 receives the setting of the sheet feed tray for feeding the insertion sheet, in insertion sheet tray setting 1224.

In the insertion sheet tray setting 1224, the user can select the setting of the sheet feed tray for feeding the insertion sheet from "same as job", "tray designation", or "sheet designation". The "same as job" is a setting for selecting the same sheet feed tray as the sheet feed tray for the target sheet. The "tray designation" is a setting in which the user designates or specifies the sheet feed tray. The "sheet designation" is a setting with which the user designates or specifies the type of the sheet. In the example illustrated in FIG. 6, the user selects "tray designation".

In a case where the user selects "tray designation", the image forming controller 16 receives a user input to designate or specify the sheet feed tray. The sheet feed tray that can be specified is one of the sheet feed trays 411 to 413 included in the sheet feed device 40 and the sheet feed trays 151 to 153. In the example illustrated in FIG. 6, the user has selected "tray 2".

The sheet feed tray stores sheets according to a predetermined type and/or size of the sheet, and thus the user can select the type and/or the size of the sheet to be used as the insertion sheet by selecting the sheet feed tray.

When the user selects "sheet specification", the image forming controller 16 receives a user input to specify the type of the sheet.

A case will be described where the user has specified the sheet feed tray for the insertion sheet which is different from the sheet feed tray for the target sheet or has specified the type of the insertion sheet which is different from the type of the target sheet. In this case, for example, the user can reduce the cost of sheets by using, as the insertion sheet, the sheet that is less expensive than the target sheet.

In the example illustrated in FIG. 6, the image forming controller 16 receives a setting of the image to be formed on the insertion sheet, in the insertion sheet image setting 1225.

In the insertion sheet image setting 1225, the user can select the setting of the image to be formed on the insertion sheet from "blank" in which the image is not formed or "image designation" in which the user designates or specifies the image to be formed. In the example illustrated in FIG. 6, the user selects "blank".

When the user selects "image designation", the image forming controller 16 receives a user input to designate or specify the image to be formed on the insertion sheet. The image to be formed on the insertion sheet is, for example, the image indicating the insertion sheet or a chart (patch) for image quality adjustment. The image to be formed on the insertion sheet may be the image different from the job image of the job.

When the insertion sheet is blank or the image forming section 14 forms the image different from the job image on the insertion sheet, the user can easily distinguish between the insertion sheet and the target sheet.

In the example illustrated in FIG. 6, the image forming controller 16 receives the setting of the sheet ejection tray for ejecting the insertion sheet, in the sheet ejection tray setting 1226.

The user can select a setting of the sheet ejection tray to which the insertion sheet is ejected from "same as job" or "tray designation" in the sheet ejection tray setting 1226. The "same as job" is a setting for selecting the same sheet ejection tray as the sheet ejection tray for the target sheet. The "tray designation" is a setting in which the user designates or specifies the sheet ejection tray. In the example illustrated in FIG. 6, the user selects "tray designation".

In a case where the user selects the "tray designation", the image forming controller 16 receives a user input to designate or specify the sheet ejection tray. The sheet ejection tray that can be specified is the large-capacity sheet ejection tray T1 or the sub-tray T2. In the example illustrated in FIG. 6, the user selects "sub-tray (T2)".

Next, the image forming controller 16 determines whether or not the user has selected "automatic determination" in the setting of the number-of-insertion-sheets setting (before) 1221 or the number-of-insertion-sheets setting (after) 1222 in step S2 (step S3).

When the user selects "automatic determination" (step S3; YES), the image forming controller 16 calculates a laminate stable distance that is a distance until the lamination becomes stable (step S4). In the present embodiment, the laminate stable distance for the insertion sheet to be inserted before the target sheet and the laminate stable distance for the insertion sheet to be inserted after the target sheet are the same.

FIG. 7 shows an example of calculation of the laminate stable distance.

As shown in FIG. 7, the image forming controller 16 calculates the laminate stable distance based on the apparatus mechanism and the attaching mechanism of the laminating device 20, the type of the sheet which is the insertion sheet, and the type of the film F.

The item of the apparatus mechanism is a distance from a roller of the bonding section 263 to a roller of the fixing section 264 in the laminating device 20, and is 150 [mm] in the example illustrated in FIG. 7.

The item of the attaching mechanism is a distance L between a leading end of the first sheet and a leading end of the film F illustrated in FIG. 8 when the film F is attached to the continuously conveyed sheets. The item of the attaching mechanism is 100 [mm] in the example illustrated in FIG. 7. Alternatively, the item of the attaching mechanism may be the distance L between the rear end of the last sheet and the rear end of the film F shown in FIG. 8.

The item of the type of the sheet (i.e., the insertion sheet) is a conveyance distance until the lamination becomes stable, which corresponds to the type of the insertion sheet set in the insertion sheet tray setting 1224 in step S2. In the example illustrated in FIG. 7, the type of the insertion sheet is high-quality sheet (240 gsm), and the distance until the lamination becomes stable corresponding to the type is 150 [mm].

The item of the type of the film F is a conveyance distance until the lamination becomes stable, which corresponds to the type of the film F set in the film type setting 1223 of the step S2. In the example shown in FIG. 7, the type of the film F is the film 1, and the distance until the lamination according to the type of the film F is stabilized is 250 [mm].

The image forming controller 16 calculates 650 [mm], which is the sum of the distances of the above items, as the laminate stable distance.

Next, the image forming controller 16 calculates and determines the number of insertion sheets by the following formula (step S5).

formula: number of insertion sheets=laminate stable distance/(sheet length of each insertion sheet in conveying direction—overlapped amount of sheets continuously conveyed)

It is assumed that the laminate stable distance is 650 [mm] calculated in step S4, the sheet length of the insertion sheet is 420 [mm], and the amount of overlap is 5 [mm]. In this case, the image forming controller 16 calculates the number of insertion sheets to be 1.6 sheets by the above formula. In this case, the image forming controller 16 determines 2 sheets obtained by rounding up 1.6 sheets after a decimal point as the number of insertion sheets.

When the user selects "user specification" in the number-of-insertion-sheets setting (before) 1221 and the number-of-insertion-sheets setting (after) 1222 of step S2 (step S3; NO), the image forming controller 16 shifts the present processing to step S6.

Next, the image forming controller 16 controls the sheet feed device 40 or the sheet feed section 15 to feed the number of insertion sheets designated by the user in step S2 from the sheet feed tray set in the insertion sheet tray setting 1224 in step S2. Alternatively, the image forming controller 16 feeds the number of insertion sheets determined in step S5 from the sheet feed tray (step S6).

Next, the image forming controller 16 determines whether or not to form the image on the insertion sheet, that is, whether or not the image to be formed has been specified by the user in the insertion sheet image setting 1225 of step S2 (step S7).

If the image is to be formed on the insertion sheet (YES in step S7), the image forming controller 16 controls the image forming section 14 to form the image on the insertion sheet (step S8). The image is specified by the user in the insertion sheet image setting 1225 of step S2.

Next, the image forming controller 16 controls the sheet feed device 40 or the sheet feed section 15 to feed, as target sheets, the number of sheets corresponding to the number of outputs of the job set in the number-of-copies setting 1213 in step S1 from the sheet feed tray (step S9). The sheet feed tray is set in the sheet feed tray setting 1211 of step S1.

Next, the image forming controller 16 controls the image forming section 14 to form the job image of the job on the target sheet (step S10).

Next, the image forming controller 16 performs steps S6 and S8 similar to steps S11 and S12, and ends the present processing.

A case where the image is not formed on the insertion sheet (step S7; YES), that is, a case where the user selects "blank sheet" in the insertion sheet image setting 1225 of step S2 will be described. In this case, the image forming controller 16 performs steps S9 to S11 similar to steps S13 to S15, and ends the present processing.

Next, the image forming controller 16 ejects the insertion sheet and the target sheet subjected to the above-described sheet feeding and image forming processing, and conveys them to the laminating device 20.

Next, the controller 21 of the laminating device 20 executes the laminating processing illustrated in FIG. 9 on the insertion sheet and the target sheet.

The controller 21 controls the continuous conveying section 24 to overlap the insertion sheet and the target sheet and convey them in a continuous belt shape without any interval (step A1).

Next, the controller 21 controls the laminating section 26 to attach the film F to the insertion sheet and the target sheet (step A2).

Figure 10:
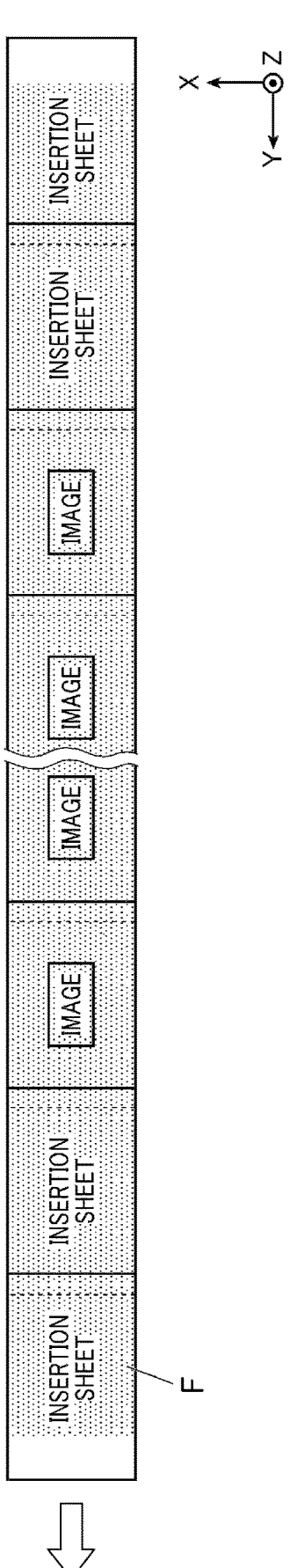
FIG. 10 is a diagram illustrating an example of an insertion sheet and a target sheet to which the laminate film is attached according to the first embodiment.

FIG. 10 illustrates a view in which a film F is attached on the insertion sheet and the target sheet.

In the example illustrated in FIG. 10, the number of insertion sheets to be inserted before and after the target sheet on which the job image has been formed is two each.

By inserting the insertion sheet before and after the target sheet in the sheet feeding and image forming processing, the target sheet can be stably laminated.

In the example shown in FIG. 10, the width of the insertion sheet and the target sheet is the same as the width of the film F, but the invention is not limited thereto. The width of the film F may be smaller than the widths of the insertion sheet and the target sheet. The widths of the insertion sheet and the target sheet are the lengths in the direction orthogonal to the conveying direction indicated by the arrow in FIG. 10.

Next, the controller 21 controls the cutting section 27 to cut off the insertion sheet with the film F attached thereto and the target sheet one by one and convey them to the stacker device (step A3), and ends the present process.

Next, the controller 31 of the stacker device 30 performs a sheet ejection processing on the insertion sheet and the target sheet on which the lamination has been performed.

In the sheet ejection processing, the controller 31 ejects the insertion sheet to the sheet ejection tray set in the sheet ejection tray setting 1226 in step S2 of the sheet feeding and image forming processing.

The controller 31 ejects the target sheet to the sheet ejection tray set in the sheet ejection tray setting 1212 of step S1 of the sheet feeding and image forming processing.

Second Embodiment

Next, the second embodiment will be described.

Hereinafter, differences from the first embodiment will be mainly described.

(Configuration of Laminating System)

Figure 11:
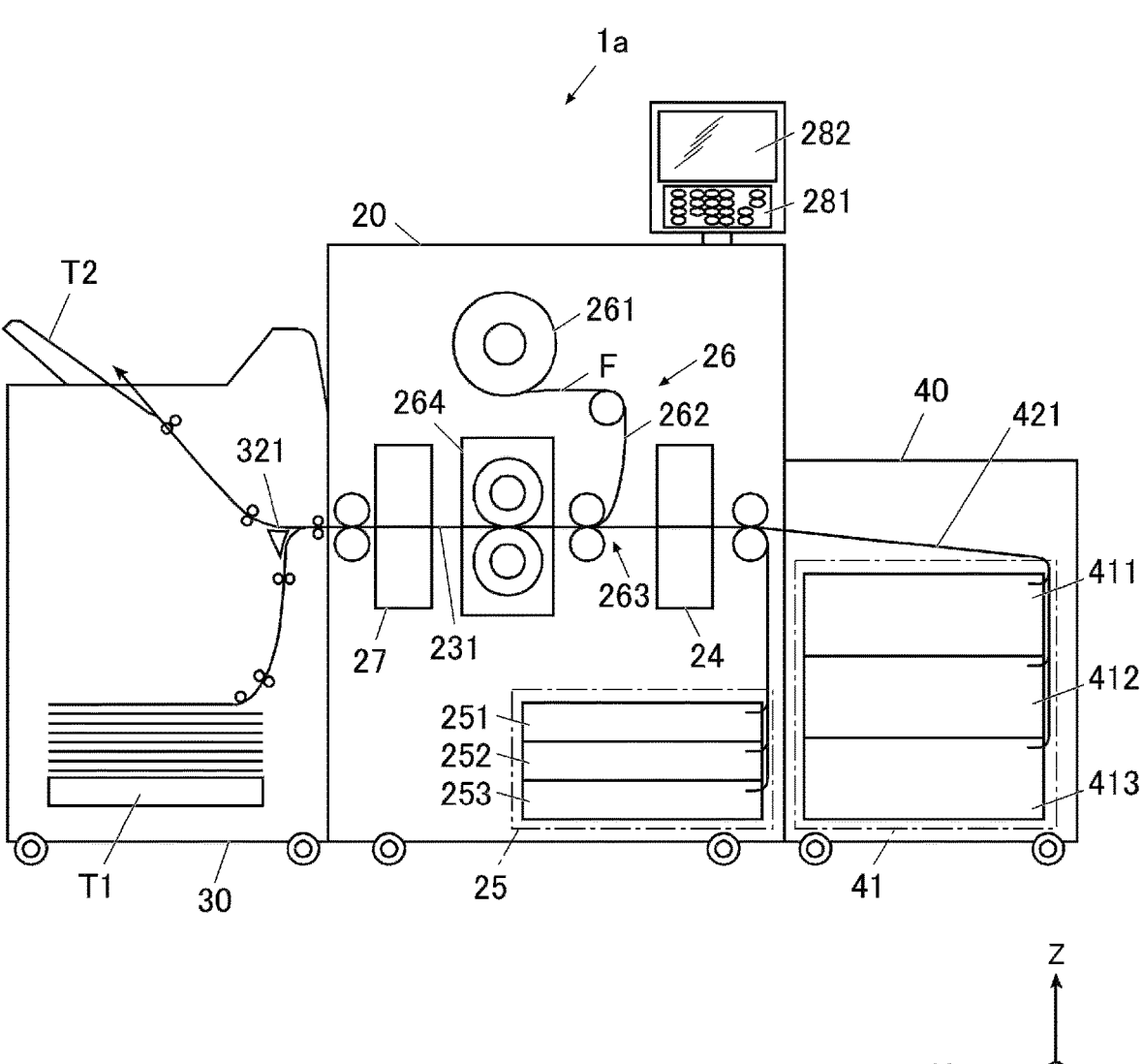
FIG. 11 is a front view showing a schematic configuration of the laminating system according to a second embodiment.
Figure 12:
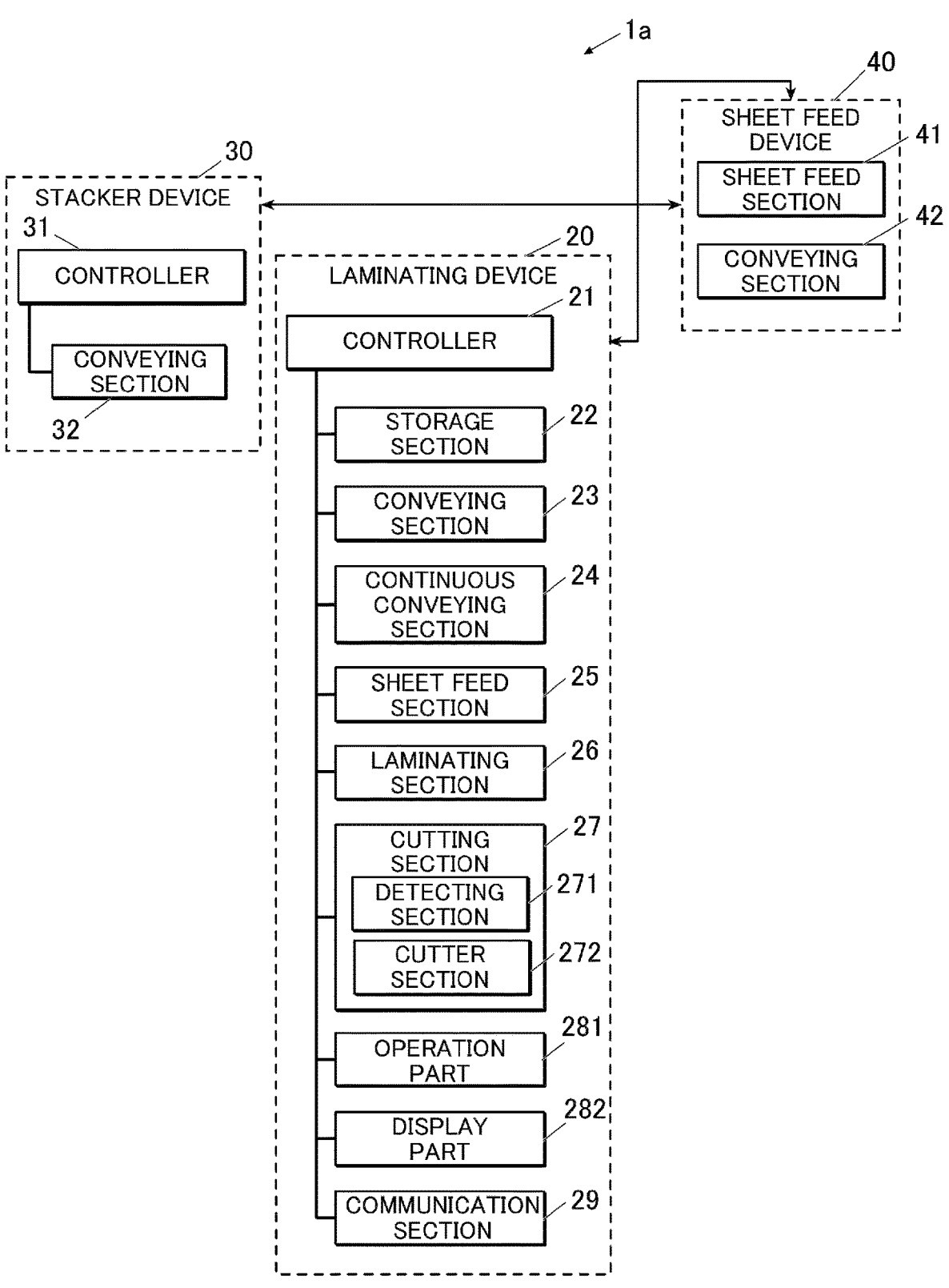
FIG. 12 is a functional block diagram showing a control structure of the laminating system according to the second embodiment.

As illustrated in FIGS. 11 and 12, the laminating system (hereinafter referred to as system 1a) according to the second embodiment comprises a sheet feed device 40, a laminating device 20, and a stacker device 30.

The laminating device 20 of the second embodiment further comprises a sheet feed section (or sheet feeder) 25 having the same configuration as the sheet feed section 15 of the first embodiment, an operation part (or operation device) 281 having the same configuration as the operation part 11 of the first embodiment, a display part (or display device) 282 having the same configuration as the display part 12 of the first embodiment, and a communication section (or communication interface) 29 having the same configuration as the communication section 18 of the first embodiment.

Any one of the sheet feed trays 411 to 413 which are housing sections included in the sheet feed device 40 according to the second embodiment and the sheet feed trays 251 to 253 which are housing sections (or housings) included in the sheet feed section 25 stores target sheets on which job images have been formed.

The controller 21 of the second embodiment is a hardware processor.

The controller 21 of the second embodiment instructs the stacker device 30 to execute a predetermined sheet ejection processing.

The controller 21 of the second embodiment causes the sheet feed section 41 of the sheet feed device 40 or the sheet feed section 25 to feed the insertion sheet at least before or after the target sheet of the laminating processing in the job.

The controller 21 of the second embodiment calculates the number of insertion sheets to be inserted based on the stable distance (laminate stable distance) of the laminating processing and the length of the cut sheet (sheet) in the conveying direction. The controller 21 functions as a calculator.

The controller 21 of the second embodiment receives a user input to specify the number of insertion sheets to be inserted via the operation part 281. The controller 21 functions as a receiver.

(Operation of Laminating System)

Next, the operation of the system 1a according to the second embodiment will be described with reference to the flowchart of FIG. 13.

Figure 13:
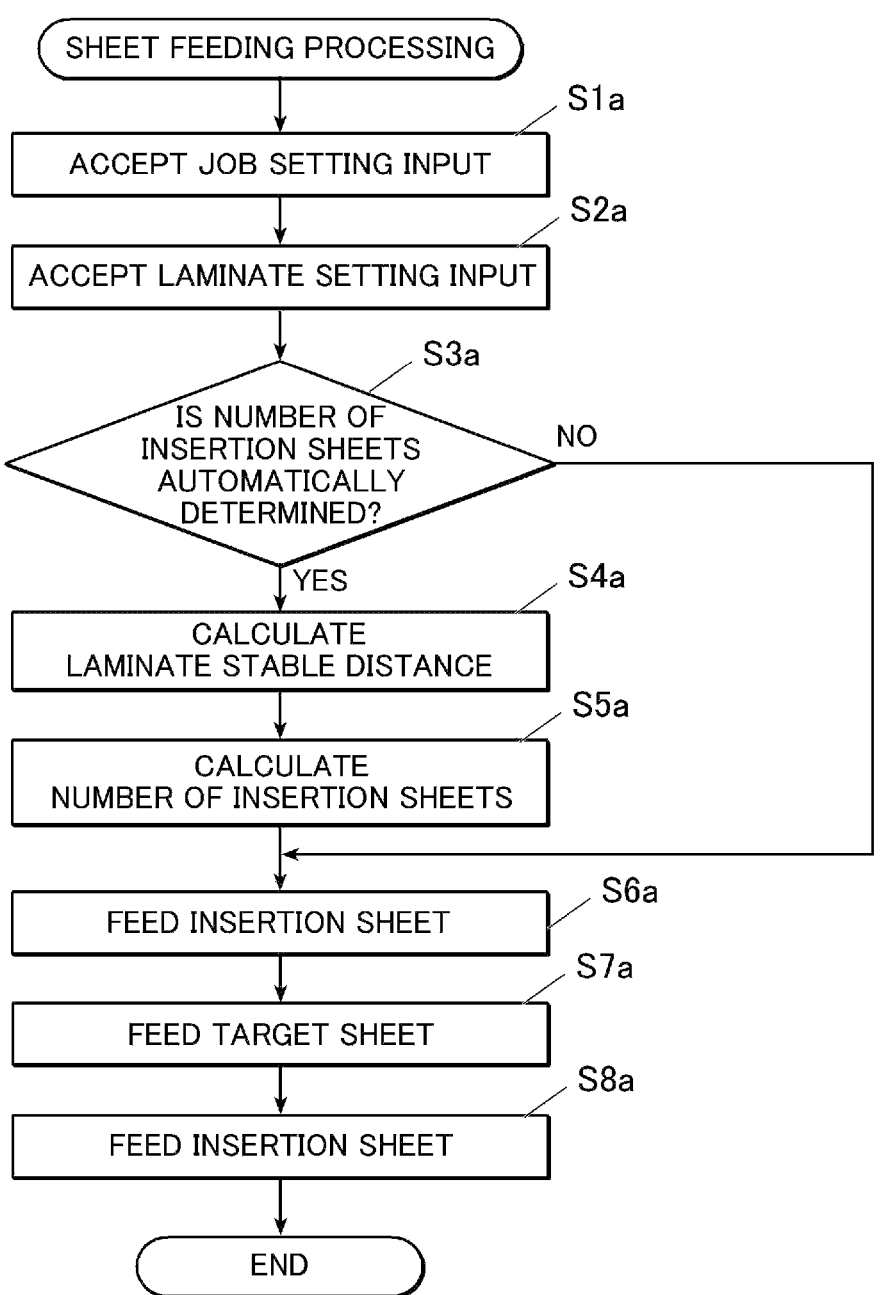
FIG. 13 is a flowchart showing the flow of the sheet feeding processing according to the second embodiment.

The system 1a executes the sheet feeding processing illustrated in FIG. 13 when the laminating device 20 receives a job including laminating processing from the external device via the communication section 29 or when the job is input by the user via the operation part 281.

The sheet feeding processing inserts insertion sheets before and after a target sheet to be laminated.

In the sheet feeding processing, the controller 21 allows the display part 282 to display a job setting screen 121 illustrated in FIG. 5, similarly to step S1 of the sheet feeding and image forming processing described above. The controller 21 receives a user input of the job setting via the operation part 281 (step S1a).

A case where the user selects "automatic selection" in the sheet feed tray setting 1211 will be described. In this case, the controller 21 selects the sheet feed tray that stores the target sheet on which the job image is formed, as the sheet feed tray that feeds the target sheet.

In a case where the user selects "tray designation", the controller 21 receives the user input to designate or specify the sheet feed tray. The user designates or specifies the sheet feed tray that stores the target sheet on which the job image is formed, as the sheet feed tray that feeds the target sheet.

Figure 14:
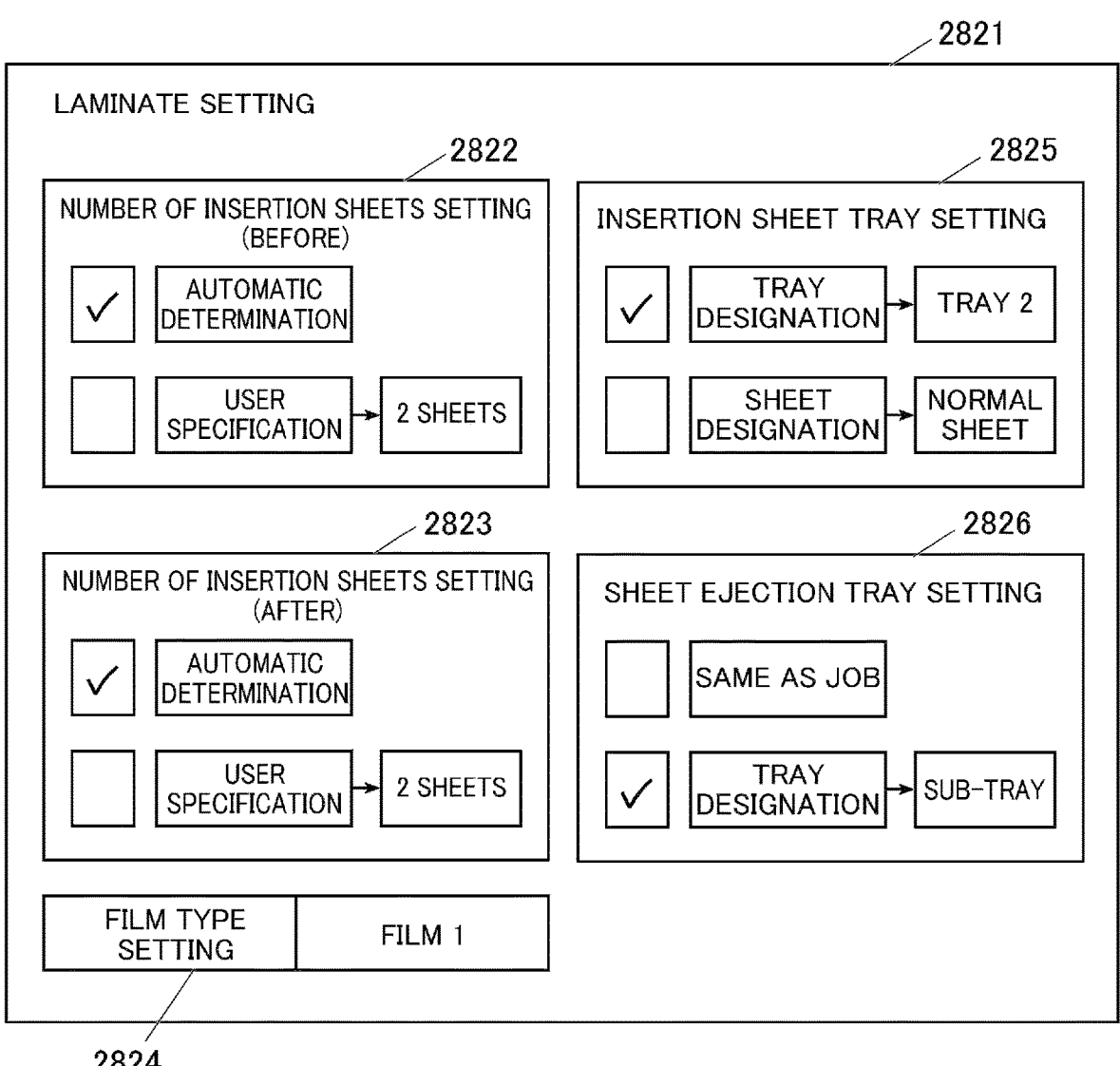
FIG. 14 is a diagram illustrating an example of the laminate setting screen according to the second embodiment.

A case will be described in which, in the post-processing setting 1214, the user selects "laminate" processing as post-processing to be performed on the target sheet and presses a setting button 1214a. In this case, the controller 21 causes the display part 282 to display a laminate setting screen 2821 as shown in FIG. 14. The controller 21 receives a user input of lamination setting via the operation part 281 (step S2a).

In the example shown in FIG. 14, the controller 21 receives the setting of the number of insertion sheets to be inserted before the target sheet, in the number-of-insertion-sheets setting (before) 2822, in the same manner as in step S2 of the sheet feeding and image forming processing.

The controller 21 receives the setting of the number of insertion sheets to be inserted after the target sheet, in a number-of-insertion-sheets setting (after) 2823, in the same manner as in step S2 of the sheet feeding and image forming processing described above.

The controller 21 receives setting of the type of film F with which laminating processing is performed on the target sheet, in a film type setting 2824, in the same manner as in step S2 of the sheet feeding and image forming processing described above.

In the example illustrated in FIG. 14, the controller 21 receives the setting of the sheet feed tray for feeding the insertion sheet in an insertion sheet tray setting 2825.

In the insertion sheet tray setting 2825, the user can select the setting of the sheet feed tray for feeding the insertion sheet from "tray designation" or "sheet designation". The "tray designation" is a setting in which the user designates or specifies the sheet feed tray. The "sheet designation" is a setting with which the user designates or specifies the type of the sheet. In the example illustrated in FIG. 14, the user selects "tray designation".

In a case where the user selects "tray designation", the controller 21 receives a user input to designate or specify the sheet feed tray. The sheet feed tray that can be specified is the sheet feed tray that does not contain the target sheet among the sheet feed trays 411 to 413 and the sheet feed trays 251 to 253 included in the sheet feed device 40. In the example illustrated in FIG. 14, the user has selected "tray 2".

The sheet feed tray stores sheets according to a predetermined type and/or size, and thus the user can select the type and/or size of the sheet to be used as the insertion sheet by selecting the sheet feed tray.

In a case where the user selects "sheet designation", the controller 21 receives the user input to designate or specify the type of the sheet.

In the example shown in FIG. 14, the controller 21 receives the setting of the sheet ejection tray for ejecting the insertion sheet, in the sheet ejection tray setting 2826, in the same manner as in step S2 of the sheet feeding and image forming processing.

Next, the controller 21 executes steps S3a to S8a similar to steps S3 to S6, S9, and S11 of the above-described sheet feeding and image forming processing, and ends the present processing.

The laminating method of the first embodiment and the second embodiment is a hot laminating method of melting and fixing the adhesive layer of the film F by the fixing section 264, but is not limited thereto. The lamination method may be a cold laminating method in which fixing is performed by the adhesive layer of the film F which can be adhered at room temperature without heating in the fixing section 264.

As described above, the laminating system (system 1) according to the present embodiment comprises the sheet feed sections (sheet feed section 41, sheet feed section 15, and sheet feed section 25) that feed a plurality of cut sheets (sheets), the continuous conveying section 24 that conveys the cut sheets fed by the sheet feed sections without an interval between cut sheets, the laminating section 26 that executes the laminating processing and attaches the laminate film (film F) to the cut sheets conveyed by the continuous conveying section 24, and the controller (image forming controller 16 and controller 21) that causes the sheet feed sections to feed the insertion sheet at least before or after the target sheet of the laminating processing.

Therefore, since insertion sheets that are waste sheets can be automatically inserted before and after the sheet to be subjected to the laminating processing, the laminating processing can be efficiently performed with high quality.

The laminating system according to the present embodiment comprises the image forming section 14 that forms the image on the cut sheet fed by the sheet feed section, and the image forming controller 16 that controls the image forming section 14.

Therefore, it is possible to form the image on only the target sheet or on the insertion sheet and the target sheet.

In the laminating system according to the present embodiment, the image forming controller 16 causes the image forming section 14 to refrain from forming the image on the insertion sheet but to form the image on the target sheet.

Therefore, since the insertion sheet can be set as the blank sheet and the job image can be formed on the target sheet, the user can easily distinguish between the insertion sheet and the target sheet.

In the laminating system according to the present embodiment, the image forming controller 16 causes the image forming section 14 to form the image different from the image to be formed on the target sheet on the insertion sheet.

Therefore, the user can easily distinguish between the insertion sheet and the target sheet by the formed image.

In the laminating system according to the present embodiment, the sheet feed section comprises the housing sections (sheet feed trays 411 to 413, sheet feed trays 151 to 153, and sheet feed trays 251 to 253) storing the cut sheets, and the controller causes the insertion sheet to be fed from the housing section different from any of the remaining housing sections from which the target sheet is fed.

Therefore, for example, if the sheet feed tray for the insertion sheet is selected to be different from the sheet feed tray for the target sheet, and if the insertion sheet is less expensive than the target sheet, the cost of the sheet can be reduced.

In the laminating system according to the present embodiment, the width of the insertion sheet is equal to or greater than the width of the laminate film.

Therefore, it is possible to prevent the adhesive layer of the laminate film from adhering to the roller or the conveying path in the laminating device 20 and causing conveying trouble.

In the laminating system according to the present embodiment, the type of the insertion sheet is the same as the type of the target sheet.

Therefore, by selecting the same sheet feed tray as the sheet feed tray of the target sheet as the sheet feed tray for feeding the insertion sheet, it is possible to save the user the trouble of designating the sheet feed tray of the insertion sheet or designating the type of the insertion sheet.

In the laminating system according to the present embodiment, the type of the insertion sheet is different from the type of the target sheet.

Therefore, for example, if the sheet that is less expensive than the target sheet is used as the insertion sheet, the cost of the sheet can be reduced.

The laminating system according to the present embodiment comprises the calculator (the image forming controller 16 and the controller 21) that calculates the number of insertion sheets to be inserted based on the stable distance of the laminating processing and the length of the cut sheet in the conveying direction, and the controller causes the number of insertion sheets calculated by the calculator to be fed.

Accordingly, as many insertion sheets as the number of sheets by which lamination is stable can be inserted, and thus stable lamination can be performed on the target sheet.

In the laminating system according to the present embodiment, the calculator calculates the stable distance based on at least one of the type of the laminate film and the type of the cut sheet.

Therefore, a more appropriate laminate stable distance can be calculated.

The laminating system according to the present embodiment comprises the receiver (the image forming controller

16 and the controller 21) that receives the user input to specify the number of insertion sheets to be inserted, and the controller causes the sheet feeder to feed the specified number of the insertion sheets.

Therefore, the user can insert the desired number of sheets of the insertion sheet.

In the laminating system according to the present embodiment, the continuous conveying section 24 conveys the cut sheet with the rear end portion of the preceding cut sheet overlapping the upper portion of the front end portion of the following cut sheet by a predetermined amount.

Therefore, it is possible to prevent the adhesive layer of the laminate film from adhering to the roller or the conveying path in the laminating device 20 and causing conveying trouble.

The laminating system according to the present embodiment comprises the fixing section 264 that performs thermocompression bonding on the cut sheet to which the laminate film is attached.

Therefore, the laminate film can be attached and fixed to the sheet by the hot laminating method.

In the laminating system according to the present embodiment, the laminate film includes the base material layer and the adhesive layer laminated on one surface of the base material layer.

Therefore, the laminate film can be attached and fixed to the sheet also by the cold laminating method.

The laminating system according to the present embodiment comprises the cutting section 27 that cuts the laminate film along the edge of the rear end of the preceding cut sheet or the edge of the front end of the following cut sheet subjected to the laminating processing by the laminating section 26.

Therefore, the sheets on which the laminating processing is performed can be cut off one by one.

Although specific description has been given above based on the embodiments according to the present invention, the present invention is not limited to the above-described embodiments, and modifications can be made without departing from the spirit and scope of the present invention.

For example, although the continuous conveying section 24 causes the rear end portion of the preceding sheet to overlap the upper portion of the front end portion of the following sheet by the predetermined overlap amount in the embodiments described above, there is no limitation thereto. The continuous conveying section 24 may perform continuous conveying such that the overlap amount is 0, that is, the rear end edge of the preceding sheet and the front end edge of the following sheet are in contact with each other. The continuous conveying section 24 may overlap the rear end portion of the preceding sheet with the lower portion of the front end portion of the following sheet by the predetermined overlap amount.

In a case where the continuous conveying section 24 overlaps the rear end portion of the preceding sheet on the lower portion of the front end portion of the following sheet by the predetermined overlap amount, the cutting section 27 cuts the film F along the front end edge of the following sheet.

In the above-described embodiments, the sheet feeding and image forming processing or the sheet feeding processing is executed, and the insertion sheets are inserted before and after the target sheet. The sheet feeding and image forming processing or the sheet feeding processing of the above-described embodiments may be executed, and the insertion sheet may be inserted in only one between before or after the target sheet.

In addition, the detailed configuration of each device constituting the laminating system and the detailed operation of each device can be appropriately changed without departing from the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A laminating system comprising:
a sheet feeder that feeds a plurality of cut sheets;
an image forming device that forms an image on each of the cut sheets fed by the sheet feeder in a job;
a continuous conveyor that conveys the cut sheets fed by the sheet feeder without any interval between the cut sheets after the image forming device forms the image in the job;
a laminator that executes laminating processing in the job and attaches a laminate film to a target sheet among the cut sheets conveyed by the continuous conveyor; and
a hardware processor that:
    causes the sheet feeder to feed, as one or more insertion sheets, one or more waste sheets that are not used for a correct product of the job, at least before or after the target sheet of the laminating processing,
    causes the laminator to execute the laminating processing to the insertion sheets as well as the target sheet, and
    causes the image forming device to refrain from forming the image on each of the insertion sheets but to form the image on the target sheet.

2. The laminating system according to claim 1, wherein the sheet feeder comprises a plurality of housings each of which is configured to store the cut sheets, and
the hardware processor causes the sheet feeder to feed the insertion sheets from, among the housings, a housing different from any of the remaining housings from which the target sheet is fed.

3. The laminating system according to claim 1, wherein a width of each of the insertion sheets is equal to or more than a width of the laminate film.

4. The laminating system according to claim 1, wherein a type of the insertion sheets is same as a type of the target sheet.

5. The laminating system according to claim 1, wherein a type of the insertion sheets is different from a type of the target sheet.

6. The laminating system according to claim 1, wherein the hardware processor further:
    calculates the number of the insertion sheets based on a stable distance of the laminating processing, a sheet length of each of the insertion sheets in a conveying direction, and an overlapped amount of the cut sheets continuously conveyed, and causes the sheet feeder to feed the calculated number of the insertion sheets.

7. The laminating system according to claim 6, wherein the hardware processor calculates the stable distance based on a type of the laminate film and a type of the cut sheets.

8. The laminating system according to claim 1, wherein the hardware processor:
    receives a user input to specify the number of the insertion sheets, and causes the sheet feeder to feed the specified number of insertion sheets.

9. The laminating system according to claim 1, wherein the continuous conveyor conveys the cut sheets in a state where a rear end portion of a preceding cut sheet is overlapped by a predetermined amount on an upper portion of a front end portion of a following cut sheet.

10. The laminating system according to claim 1, further comprising:
    a fixing device that thermally presses the target sheet to which the laminate film is attached.

11. The laminating system according to claim 1, wherein the laminate film includes a base material layer and an adhesive layer layered on one surface of the base material layer.

12. The laminating system according to claim 1, further comprising:
    a cutting device that cuts the laminate film along an edge of a rear end of a preceding cut sheet or an edge of a front end of a following cut sheet, among the cut sheets each being the target sheet subjected to the laminating processing by the laminator.

13. A non-transitory computer-readable recording medium storing instructions executed by a hardware processor in a computer of a laminating system that comprises:
a sheet feeder that feeds a plurality of cut sheets;
an image forming device that forms an image on each of the cut sheets fed by the sheet feeder in a job;
a continuous conveyor that conveys the cut sheets fed by the sheet feeder without any interval between the cut sheets after the image forming device forms the image in the job; and
a laminator that executes laminating processing in the job and attaches a laminate film to a target sheet among the cut sheets conveyed by the continuous conveyor,
the instructions causing the hardware processor to execute:
    causing the sheet feeder to feed, as one or more insertion sheets, one or more waste sheets that are not used for a correct product of the job, at least before or after the target sheet of the laminating processing, and
    causing the laminator to execute the laminating processing to the insertion sheets as well as the target sheet, and
    causing the image forming device to refrain from forming the image on each of the insertion sheets but to form the image on the target sheet.

* * * * *